United States Patent
Boesen et al.

(10) Patent No.: US 8,826,064 B2
(45) Date of Patent: Sep. 2, 2014

(54) BIOLOGICALLY INSPIRED HARDWARE CELL ARCHITECTURE

(75) Inventors: Michael Reibel Boesen, Copenhagen N (DK); Jan Madsen, Hellerup (DK)

(73) Assignee: Danmarks Tekniske Universitet, Lyngby (DK)

( * ) Notice: Subject to any disclaimer, the term of this patent is extended or adjusted under 35 U.S.C. 154(b) by 768 days.

(21) Appl. No.: 13/131,244

(22) PCT Filed: Nov. 25, 2009

(86) PCT No.: PCT/EP2009/065816
§ 371 (c)(1),
(2), (4) Date: Aug. 12, 2011

(87) PCT Pub. No.: WO2010/060923
PCT Pub. Date: Jun. 3, 2010

(65) Prior Publication Data
US 2011/0307734 A1      Dec. 15, 2011

Related U.S. Application Data

(60) Provisional application No. 61/118,900, filed on Dec. 1, 2008.

(30) Foreign Application Priority Data

Nov. 26, 2008   (EP) .................................. 08169992

(51) Int. Cl.
| | | |
|---|---|---|
| G06F 11/00 | (2006.01) | |
| G06F 9/44 | (2006.01) | |
| G06N 3/12 | (2006.01) | |
| G06F 11/20 | (2006.01) | |

(52) U.S. Cl.
CPC *G06N 3/126* (2013.01); *G06F 8/31* (2013.01); *G06F 11/2041* (2013.01); *G06F 11/2023* (2013.01)

USPC ............... 714/3; 714/2; 714/4.12; 714/10; 714/26; 714/47.1

(58) Field of Classification Search
USPC ............................ 714/2, 3, 4.12, 10, 26, 47.1
See application file for complete search history.

(56) References Cited

U.S. PATENT DOCUMENTS

| | | | | |
|---|---|---|---|---|
| 4,586,151 | A | * | 4/1986 | Buote ........................... 700/249 |
| 4,890,241 | A | * | 12/1989 | Hoffman et al. ............. 700/255 |

(Continued)

OTHER PUBLICATIONS

Mange, Daniel, Toward Robust Integrated Circuits: The Embryonics Approach, Proceedings of the IEEE, vol. 88, No. 4, Apr. 2000, pp. 516-525.

(Continued)

*Primary Examiner* — Loan L. T. Truong
(74) *Attorney, Agent, or Firm* — Polsinelli PC; Teddy C. Scott, Jr.; Ron Galant

(57) ABSTRACT

Disclosed is a system comprising: —a reconfigurable hardware platform; —a plurality of hardware units defined as cells adapted to be programmed to provide self-organization and self-maintenance of the system by means of implementing a program expressed in a programming language defined as DNA language, where each cell is adapted to communicate with one or more other cells in the system, and where the system further comprises a converter program adapted to convert keywords from the DNA language to a binary DNA code; where the self-organization comprises that the DNA code is transmitted to one or more of the cells, and each of the one or more cells is adapted to determine its function in the system; where if a fault occurs in a first cell and the first cell ceases to perform its function, self-maintenance is performed by that the system transmits information to the cells that the first cell has ceased to perform its function, and then the self-organization is performed again in order to provide that a second cell undertakes the function of the first cell.

15 Claims, 11 Drawing Sheets

(56) References Cited

U.S. PATENT DOCUMENTS

| | | | |
|---|---|---|---|
| 5,931,959 A | 8/1999 | Kwiat | |
| 6,874,108 B1 | 3/2005 | Abramovici | |
| 7,142,953 B2 | 11/2006 | Marshall | |
| 7,343,579 B2 | 3/2008 | Coxe | |
| 8,140,889 B2 * | 3/2012 | Budnik et al. | 714/4.11 |
| 2008/0213923 A1 * | 9/2008 | Boland et al. | 438/1 |
| 2008/0263386 A1 | 10/2008 | Darrington | |

OTHER PUBLICATIONS

Tempesti, Gianluca, Bio-Inspired Computing Architectures: The Embryonics Approach, Proceedings of the Seventh International Workshop on Computer Architecture for Machine Perception (CAMP '05).

Tempesti, Gianluca, A Novel Platform for Complex Bio-Inspired Architectures, Proceedings of the 2007 IEEE Workshop on Evolvable and Adaptive Hardware (WEAH 2007).

Tufte, Gunnar, Towards Development on a Silicon-Based Cellular Computing Machine, Natural Computing (2005) 4: 387-416.

Canham, Richard, An Embryonic Array with Improved Efficiency and Fault Tolerance, Proceedings of the 2003 NASA/Dod Conference on Evolvable Hardware.

Tyrrell, Andy M., POEtic Tissue: An Integrated Architecture for Bio-Inspired Hardware, ICES 2003, LNCS 2606, pp. 129-140, 2003.

Barker, Will, Fault Tolerance Using Dynamic Reconfiguration on the POEtic Tissue, IEEE Transactions on Evolutionary Computation, vol. 11, No. 5, Oct. 2007.

Upegui, Andres, The Perplexus Bio-Inspired Reconfigurable Circuit, Second NASA/ESA Conference on Adaptive Hardware and Systems (AHS 2007).

Dempster, P., A Novel Self-Repairing Platform for Embedded Systems, ISSC 2006, Dublin Institute of Technology, Jun. 28-30, pp. 375-380.

Sekanina, Lukas, Evolvable Computing by Means of Evolvable Components, Natural Computing 3: 323-355, 2004.

Kariniemi, Heikki, Fault-tolerant 2-D Mesh Network-On-Chip for Multi-Processor Systems-on-Chip, IEEE 2006.

\* cited by examiner a) b)

*Fig. 6* a)

| Cell 1 (0,0) Func1 | Cell 2 (0,1) Func2 | Cell 3 (0,2) Func3 |
|---|---|---|
| Cell 4 (1,0) Func4 | Cell 5 (1,1) Func5 | Cell 6 (1,2) Func6 |
| Cell 7 (2,0) empty | Cell 8 (2,1) empty | Cell 9 (2,2) empty | b)

| Cell 1 (0,0) Func1 | Cell 2 (0,1) Func2 | Dead (0,2) |
|---|---|---|
| Cell 3 (1,0) Func3 | Cell 4 (1,1) Func4 | Cell 5 (1,2) Func5 |
| Cell 6 (2,0) Func6 | Cell 7 (2,1) empty | Cell 8 (2,2) empty |

| Keyword | Binary | Comment |
|---|---|---|
| = | 00000 | Assignment |
| < | 00001 | - |
| <= | 00010 | - |
| RAM | 00011 | Memory access |
| != | 00100 | - |
| == | 00101 | Test if equal |
| AND | 00110 | - |
| OR | 00111 | - |
| XOR | 01000 | - |
| XNOR | 01001 | - |
| NAND | 01010 | - |
| + | 01011 | - |
| - | 01100 | - |
| ! | 01110 | Not |
| if | 01111 | - |
| then | 10000 | - |
| else | 10001 | - |
| endif | 10010 | - |
| while | 10011 | - |
| do | 10100 | - |
| endwhile | 10101 | - |
| return | 10110 | - |
| parallel | 10111 | - |
| endparallel | 11000 | - |
| SRL | 11001 | Shift Right Logical |
| SLL | 11010 | Shift Left Logical |

*Fig. 9*

*Fig. 10*
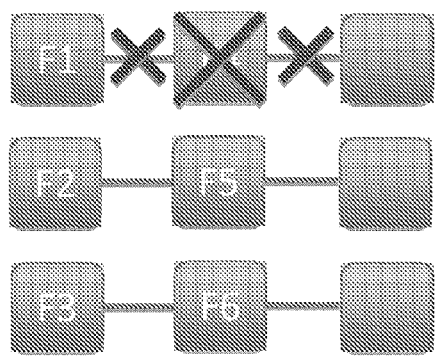
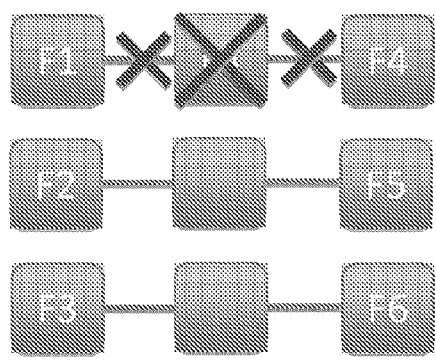
a)          PRIOR ART          b)
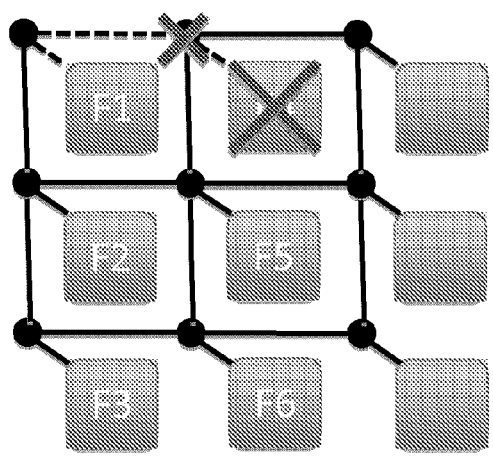
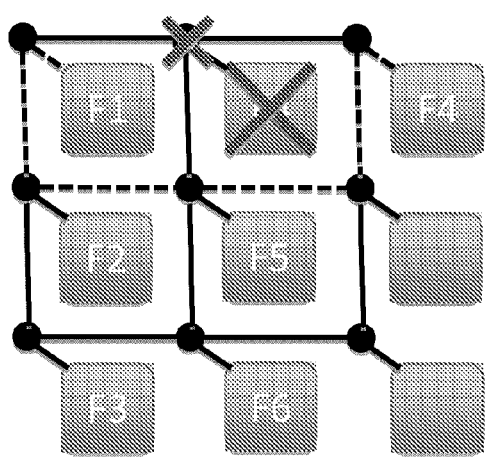
c)                        d)

BIOLOGICALLY INSPIRED HARDWARE CELL ARCHITECTURE

CROSS-REFERENCE TO RELATED APPLICATIONS

This is the national stage of International Application No. PCT/EP2009/065816 filed on Nov. 25, 2009, which claims the benefit of U.S. Provisional Patent Application No. 61/118,900, filed on Dec. 1, 2008, which claims the benefit of European Patent Application No. 08169992.8, filed on Nov. 26, 2008 the contents of all of which are incorporated herein by reference.

FIELD OF THE INVENTION

This invention generally relates to a system such as a semiconductor device which can correct faults as they occur. More particularly, the invention relates to a system comprising a reconfigurable hardware platform and a plurality of hardware units defined as cells programmable to provide self-organization and self-maintenance of the system by means of implementing a program expressed in a programming language.

BACKGROUND OF THE INVENTION

Higher fault-tolerance is becoming a more important subject in hardware design. Naturally safety-critical systems, which are systems where no errors and performance losses can be tolerated, and resilient systems, which are systems, where no errors is highly wanted and performance loss is acceptable as long as the application can be saved, are systems that require the underlying hardware platform to have higher fault-tolerance, but higher fault-tolerance are also becoming increasingly important in standard applications. It is becoming increasingly harder to fabricate semiconductor devices due to the decreasing transistor size. As transistor size decrease each atom which is placed in a wrong place constitutes more to the total transistor, thus making the transistor deformed or in the best case, slightly larger than it were supposed to be, therefore giving it slightly different electrical properties—thus introducing flaws to the device. This means that it is difficult to guarantee that a given device will work in a certain way. Therefore the technology is greatly in need of ways to monitor a semiconductor device and correct faults as they occur.

The article by Mange et al.: Towards Robust Integrated Circuits—The Embryonic Approach; Proceedings of the IEEE, IEEE, New York, US, vol. 88, no. 4, 1 Apr. 2000 discloses an approach towards development of very large-scale integrated circuits capable of self-repair and self-replication. Self-repair is defined as partial reconstruction in case of minor fault, and self-replication is defined as complete reconstruction of the original device in case of a major fault. The document applies a four-level hierarchy of embryonics: population level, organismic level, cellular level and molecular level.

U.S. Pat. No. 5,931,959 describes a fault-tolerant multiprocessor system for providing hardware based flexible fault tolerance. The system comprises a plurality of computing modules, connected to a plurality of result memories, connected through a memory interface to a reconfigurable logic and switching device. The reconfigurable logic and switching device can be programmed to both supply traditional fault tolerance functions, requiring bit-for-bit exactness and more sophisticated fault tolerance functions using more complicated algorithms, that checks whether outputs meets user-defined reasonableness criteria.

U.S. Pat. No. 6,874,108 describes a method of fault tolerant operation of a field programmable gate array. The method works by identifying a faulty resource in a signal path, and reconfiguring said signal path to exclude said faulty resource, and estimating a propagation delay caused by reconfiguring said signal path, and adjusting the system clock if the estimated propagation delay is greater than a critical path propagation delay.

U.S. Pat. No. 7,142,953 describes a digital processing system capable of being remotely configured for use in space vehicles. The digital processing system comprises a field programmable gate array for performing the processing tasks, a receiver on said space vehicles for receiving commands and a field programmable gate array configuring unit, coupled to said receiver for reconfiguring said field programmable gate array, accordingly to said commands, thereby enabling the remote configurations of said field programmable gate array.

U.S. Pat. No. 7,343,579 describes a reconfigurable adaptive computing system capable of dynamically changing the way input signals are processed during runtime. The computing system comprises a detector for generating an environmental signal based on a detected environmental condition, a controller for receiving the environmental signal and selecting a processing configuration from a plurality of processing configurations, based on that signal.

Currently the problem is sought to be solved by introducing static redundancy to the system. Static in the sense that the redundancy added is simply an extra copy of the functionality already implemented. The multiple copies of the system all perform the same function and a comparator or voter compares the output of the copies. The voter makes sure that the output which the majority of the copies output, is the one which is selected as the valid output. This is a stable solution, but it has its downsides. These are for instance:

Performance degradation: The comparator or voter circuit introduces extra delay to the system;

Increasing power and area overhead: Having x copies of the same device will of course multiply the extra area and power needed by x;

Comparator or voter failures: If the fault checking circuit fails there should be a way to handle this. And it should be possible to check this.

Furthermore, the solution described above primarily applies to Application Specific Integrated Circuits (ASICs), because reconfigurable hardware platforms like Field Programmable Gate Arrays (FPGAs) already introduces extra overhead because of their reconfigurability. Of course, the same techniques could be adopted to reconfigurable hardware platforms, but it would even further increase the overhead in terms of area, power and speed.

It remains a problem to improve reconfigurable, fault-tolerant systems.

SUMMARY

Disclosed is a system comprising:
a reconfigurable hardware platform;
a plurality of hardware units defined as cells adapted to be programmed to provide self-organization and self-maintenance of the system by means of implementing a program expressed in a programming language defined as a DNA language,
where each cell is adapted to communicate with one or more other cells in the system;

where the system further comprises a converter program adapted to convert keywords from the DNA language to a binary DNA code;

where the self-organisation comprises that the DNA code is transmitted to one or more of the cells, and each of the one or more cells is adapted to determine its function in the system; where if a fault occurs in a first cell and the first cell ceases to perform its function, self-maintenance is performed by that the system transmits information to the cells that the first cell has ceased to perform its function, and then the self-organisation is performed again in order to provide that a second cell undertakes the function of the first cell.

Consequently, it is an advantage that information about certain events in the system can be deduced fully from the DNA and from information about how many cells have died, whereby self-repair is performed by notifying all active cells that a cell has died and then rerun the self-organizing process with an updated cell-death counter.

Information in the system may be transmitted from one or more routers to the cells.

The self-organisation is the feature in the system, which reconfigures the platform and makes sure it is ready to execute the function specified by the DNA. The self-organisation may be entirely controlled and performed by the cells and no user intervention may be required. Furthermore, the self-organisation may be a distributed process, as opposed to being controlled by a centralized "oracle", and the risk of having a single-point-of-failure is therefore eliminated.

Furthermore, it is an advantage that the system is more robust than it would otherwise have been, because the information about cells can be interpreted directly from the DNA, because cells are not dependent on other cells, but only on themselves in order to function with other cells. Thus the network and the condition of other cells do not have any effect on the self-configuration.

Furthermore, it is an advantage that cell death, i.e. when a cell ceases to perform its function, can be handled very simple, because the cells shall not copy all content, e.g. variables, data etc. to the next cell. For handling cell death, the self-organisation algorithm shall just be executed and the cells will shift their function if required.

For instance, the prior art document Mange et al.: Towards Robust Integrated Circuits—The Embryonic Approach discloses faulty cells and spare cells, which are used to implement self-repair, and this document discloses that when a faulty cell appears, "the entire column to which the faulty cell belongs is considered faulty and is deactivated" and "all the functions ( . . . ) of the cells to the right of the column ( . . . ) are shifted by one column to the right" and "obviously, this process requires as many spare columns to the right of the arrays as there are faulty cells or columns to repair".

It is an advantage, in contrast to the above, that in the present system only the faulty cell itself is deactivated and not the entire column in which the faulty cells is, and thus less spare cells are required than in Mange et al.

If for instance, the platform is a square with three cells times three cells, there is a total of nine cells. If the first two columns of cells, i.e. six of the cells, have a function, there is one column, i.e. three cells, left to be used as spare cells. If a fault occurs in one of the cells with a function, then according to the system of Mange et al. the entire column with the faulty cell will be replaced with the column with the spare cells. After this, there will not be any spare cells left. Thus only one fault may occur, when there is only one column with spare cells.

Thus it is an advantage that in the present system, only the faulty cell will be replaced with a spare cell, and there may occur as many faults are there are spare cells, i.e. the number of spare columns is of no importance.

It is a further advantage that the cells do not differentiate to a register, because having a register may result in that the system runs slowly if there is a lot of data. Without a register the system runs faster, because data is forwarded directly to where it is used instead of storing data in a register, where each unit then should retrieve it from.

It is a further advantage that the DNA code is sent to the cells, such that each cell reads or extracts or determines its own function, whereby the entire DNA code does not have to be stored in every cell, or copied from cell to cell, and therefore the result is that there is one function in one cell. There may be more than one copy of the DNA code, because if there is only one copy and a fault occurs, the DNA code may be lost. Thus there may be more than one copy of the DNA code, but there will preferably not be as many copies as cells, since this would not be efficient or space-saving.

In contrast, the self-organisation in the prior art document by Mange et al.: Towards Robust Integrated Circuits—The Embryonic Approach comprises copying of data, because a mother cell holds the one and only copy of the operative genome, and this copy is then after a time t1 copied into the neighbouring or daughter cells. This process of cellular division continues until all the cells of the organism are completely programmed. Thus every cell contains all the information for all the cells. The copying of data may take a long time and all the copies may take up a lot of space.

As mentioned in the background section, it is a further advantage that static redundancy is avoided in the system, since there are disadvantages of using redundancy in a system. Avoiding static redundancy means that faults in the system can be repaired regardless of where the fault is. The present system comprises dynamic mapping.

In Mange et al. the communication takes place between the so called molecules. The network is fixed-wired, and communication is only possible between neighbour cells or molecules. Due to the static means by which communication takes place, if a fault occurs in a molecule X, both the molecule X and the wire through molecule X may be destroyed, whereby the communication in the system may become blocked and the system may thus be broken. Whereas due to the dynamic nature of the network in the present system, wire faults can be tolerated by rerouting packages.

It is an advantage that, in contrast to the above, in the present system the communication takes place between so called nodes, thus communication is possible between all cells, so if a fault occurs on a cell X, the cell X and the wire to cell X may be destroyed, but since the nodes are connected with each other through many wires, the communication will just be directed someway around cell X and its wire. Since there may be many paths between two nodes in the platform, there will most likely always be a different path between two nodes in the system, if one of the paths has been destroyed due to a faulty cell or wire. Thus the dynamic communication can occur due to the many wires, which connect nodes, whereby the communication flow can find an alternative path, if a wire on one of the paths is broken.

It is a further advantage that a converter is used to convert keywords from the DNA language to a binary DNA code.

The prior art document Mange et al.: Towards Robust Integrated Circuits—The Embryonic Approach discloses a compiler, whereas a converter program is disclosed in the present system, which is different from a compiler, as described in detail later in this application. The system disclosed in Mange et al.: Towards Robust Integrated Circuits—The Embryonic Approach requires knowledge about the platform or network structure in order to compile the DNA language, and this system communicates to every cell what its function is, and thus this system discloses the organisation of the system, and where each cell is relative to other cells. This provides an inefficient system.

It is an advantage, in contrast to the above, that the present system operates on a higher level, e.g. level of abstraction, and relates to the functionality of cells instead of to the structure and organisation of cells. Thus the present system works or requires no knowledge of the structure of the network or platform before converting the DNA language, whereby the system is fully autonomous.

The system in Mange et al.: Towards Robust Integrated Circuits—The Embryonic Approach requires a computer during the compilation, because this system is not fully autonomous. Thus in Mange et al.: Towards Robust Integrated Circuits—The Embryonic Approach the function of the cells and the structure of the network or platform is required before compilation can be performed, and after the compilation, the result is a map and the function of cells.

Thus it an advantage of the present system, that only the function of the cells is required before conversion can be performed, and after the conversion, the result is a dynamic map.

It is an advantage that the system comprises a reconfigurable hardware platform. Some prior art documents discloses using FPGA systems, but the overhead may be too large for a FPGA system to handle, and thus such systems may not be used in practice. However, the present reconfigurable hardware platform can handle and manage large amounts of data, and can therefore be used in practice.

The hardware units or cells are a part of the system, and the cell are physically arranged on the platform, thus the cells may also be defined as being part of the platform, i.e. the system comprises the cells, or the reconfigurable hardware platform comprises the plurality of hardware units, defined as cells.

Disclosed is a system comprising a reconfigurable hardware platform, a plurality of hardware units defined as cells and a converter program adapted to convert keywords from the DNA language to a binary DNA code.

The converter program may be denoted as converter means instead of converter program, and clearly converter means can be a structural feature. Alternatively, instead of a converter program, the system may comprise a storage medium having stored thereon a converter program, or the system may comprise processing means adapted to execute a converter program. Furthermore, the system may comprise a storage medium having stored thereon a computer program comprising executable program code means adapted to cause a processing means to perform the steps of converting keywords from the DNA language to a binary DNA code, when the program code means are executed by the processing means.

Alternatively, the system may comprise processing means adapted to execute a computer program comprising executable program code means adapted to cause the processing means to perform the steps of converting keywords from the DNA language to a binary DNA code, when the program code means are executed by the processing means.

The system described above may be defined as an individual setup.

The programming language defined as DNA language is implemented using user-defined algorithms.

The system presented is an easy programmable, resilient, biologically inspired, dynamical, reconfigurable, self-organizing and self-maintaining hardware platform.

Easy programmable may be defined as that the system presents a methodology, defined as DNA or electronic DNA (eDNA), with which it may be possible to configure a reconfigurable platform with only an algorithmic specification, which may describe the behavior which is to be implemented. No synthesis tool or compiler may be needed, thus making it an easy and extremely fast way of configuring a reconfigurable platform.

The expressions DNA and electronic DNA (eDNA) are used in the application to define the same subject-matter.

Resilient may be defined as that the system is resilient because it can detect a fault and may correct it by reconfiguring the faulty part of the functionality at another place on the platform. A fault can be detected by built-in self-test or data integrity tests.

Biologically inspired may be defined as that the system is inspired from biological cells. Biological cells are able to interpret DNA and from this determine what their function in the organ is, that is the cells are self-organizing. Furthermore, biological cells are able to regenerate new cells when old cells die. This makes the organism self-maintaining, because it can correct faults, by replacing lost functionality with new cells creating the same functionality.

Dynamical reconfigurable may be defined as that the cells may contain a reconfigurable core, which simply may be an Arithmetic Logic Unit (ALU) which can perform different predefined mathematical functions. The system is dynamical reconfigurable because the cells may be able to change the function of the ALU by changing a selection signal.

Self-organizing may be defined as that the hardware cells may interpret the electronic DNA which, as explained above, may describe the behavior which is to be implemented. Because of the unique way the cells may interpret the DNA, they can determine what their function in the total system is, what function other cells have etc. All information needed by the cells can be determined from the DNA. By self-organisation the system initializes itself and interprets the DNA.

Self-maintaining may be defined as that the hardware cells may be able to detect whether a fault has occurred within it. If this is the case, the cells may perish. Other cells may notice this and they may utilize information stored in the system as well as the DNA, to move the functionality, which the dead cell(s) had, to another place on the hardware platform. By self-maintenance the system corrects faults in the system.

The hardware platform of the system presented here may be a model of a semiconductor device.

The function of a cell in the system can be the activity it has to perform. When a second cell undertakes the function of the first cell, the second cell inherits the function of the first cell.

In some embodiments each cell comprises an arithmetic logic unit (ALU), a random access memory (RAM), whereby the cells can handle complex memory functions, and a network adaptor.

In some embodiments the cells are adapted to behave like a language parser, whereby only DNA code is used for performing self-organisation and self-maintenance of the system.

An advantage of this embodiment is that only the DNA code is used for initializing and repairing the system, and the self-organisation and self-maintenance are not dependent on communication between cells. The structure of the network and algorithms provide that the cells can behave like a language parser, as described in more detail in the description. E.g. a cell deduce information on functionality directly from the DNA, which is the language, and no other cells are used to provide information, whereby each cell is itself responsible for achieving its functionality and its own setup. The cells do not differentiate to a register, thus no registers are used, except the memory or storage or register in the cells.

In some embodiments the system further comprises at least one data recovery centre (DRC), which is a table containing one or more variables in the system, where the DRC is produced by that at least one cell differentiates to become the DRC.

An advantage of this embodiment is that a data recovery centre (DRC) enables that errors in the system can be repaired. The DRC functions as an extra security arrangement. A DRC is a table which keeps track of what the different variables in the system are. One cell may differentiate to one DRC. There may be more than one DRC in the system, and thus the number of DRC's corresponds to the number of cells which have differentiated to become a DRC. When an expression in DNA changes the value of a variable, e.g. in a=b+c the value of "a" changes, then this value is communicated to the relevant cells and to e.g. two DRCs, which each maintains a copy, i.e. thereby two similar copies are maintained of which values that, for the present, are the correct values. This results in that if a first cell dies, then when a second cell undertakes or inherits the function of the first cell, the second cell inquires from the DRCs which values that are correct. This furthermore provides the DRCs with the possibility to keep track of which data that is located in RAM cells. The addition of DRCs results in that the system is more robust, because the system does not collapse if a RAM cell dies, because the value can be reproduced with the DRCs.

A further advantage of this embodiment is that by having a DRC, register cells become unnecessary for the system, and this furthermore eliminates the risk of having dead register cells.

The prior art document Mange et al.: Towards Robust Integrated Circuits—The Embryonic Approach does not discloses data recovery centres, but only duplication of logic, copies etc., which is avoided in the present system, as described above.

In some embodiments the cells request and transmit information from and to other cells in the system.

An advantage of this embodiment is that information is distributed in the system by that cells communicate with each other.

The system according to this embodiment may be defined as a cooperative setup.

In some embodiments a third cell undertakes the function of the second cell, if the second cell has undertaken the function of the first cell.

An advantage of this embodiment is that all functions will always be performed, since the active cells ensure to perform the function of dead cells.

In some embodiments each cell calculates whether it is positioned before or after the first cell following a growth pattern, and if the cell is positioned after the first cell, the cell is renumbered to have a cell number that is one less than the number it had before.

An advantage of this embodiment is that cells get a new cell number if they are positioned after a dead cell, so that a specific function is related to a specific cell number.

In some embodiments one or more routers adapted to provide communication between two or more cells.

In some embodiments a portion of the cells are located in a network-on-chip (NoC) topology, such as for example a cluster, whereby they are adapted to share one router by means of which they can communicate with other cells.

In some embodiments a DNA optimization program provides a placement decision concerning where in the DNA code a random access memory (RAM) function is arranged.

An advantage of this embodiment is that cells can be reorganized, so that e.g. the RAM lies close to all cells, so that the system may run faster.

In some embodiments a DNA syntax defined as a parallel syntax is adapted to provide that independent parts of the system are executed in parallel.

An advantage of this embodiment is that the application may run faster due to the parallel execution. Parallel execution can be obtained by splitting the start signal, as described in more detail in connection with FIG. 4.

In some embodiments the parallel syntax is adapted to provide that the cells grow the independent, parallel parts in parallel. If two or more parts of the DNA program code are surrounded by the parallel syntax, it allows the cells to grow these independent parts in parallel.

In some embodiments cells are adapted to implement a function on a higher level of logical granularity than gate-level.

An advantage of this embodiment is that hereby each cell is adapted to perform a complex function, instead of that a cell has only e.g. a simple function. This is implemented by that transistors are put together to logical components. Thus one cell can e.g. perform a number of logic functions such as AND and OR, instead of only performing one logic function. Hereby it may be easier, faster and less power demanding to implement a complex DNA code.

In some embodiments a ripple carry adder (RCA) occupies only 1 cell.

An advantage of this embodiment is that the system may run faster when a ripple carry adder only occupies one cell instead of occupying a higher number of cells.

In some embodiments the cells are adapted to interpret the DNA code in a functional way, whereby each function that the DNA code expresses is placed in one cell.

An advantage of this embodiment is that when interpreting DNA code in a functional way as opposed to a structural way, more than one function may be placed in only one cell, instead of placing one function in several cells.

In some embodiments one cell defined as a guard cell performs the function of a guardian circuitry.

An advantage of this embodiment is that only one cell is used as guard cell instead of using e.g. four guard cells.

In some embodiments the DNA code is adapted to implement multiple <statements>.

An advantage of this embodiment is that when the system can take multiple statements e.g. of the type <if> and <while>, the system works as desired and may also run faster. The expression <statement>, i.e. the word statement with italics and in brackets, means that this expression refers to the statements in the DNA language, as described in more detail later in the description.

The present invention relates to different aspects including the system described above and in the following, and corresponding methods, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a method of providing self-organization and self-maintenance of a system comprising a reconfigurable hardware platform and a plurality of hardware units defined as cells, where the method comprises:
  programming one or more of the cells to provide self-organization and self-maintenance of the system by means of implementing a program expressed in a programming language defined as DNA language, and where each cell is adapted to communicate with one or more other cells in the system, converting keywords from the DNA language to a binary DNA code by means of a converter program;

transmitting the DNA code to one or more of the cells, and each of the one or more cells is adapted to determine its function in the system;

transmitting information to the cells, if a fault occurs in a first cell and the first cells ceases to perform its function, whereby self-maintenance is performed by the system; and performing the self-organisation again in order to provide that a second cell undertakes the function of the first cell.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 6 shows how self-maintenance can be performed.

FIG. 9 is a table showing how a keyword from the DNA programming language can be translated to a corresponding binary code.

FIG. 10 shows examples of the communication according to prior art compared to the present system in case of faults.

DETAILED DESCRIPTION

In the following description, reference is made to the accompanying figures, which show by way of illustration how the invention may be practiced.

FIG. 1 shows an example of a platform according to the present system.

Figure 1A:
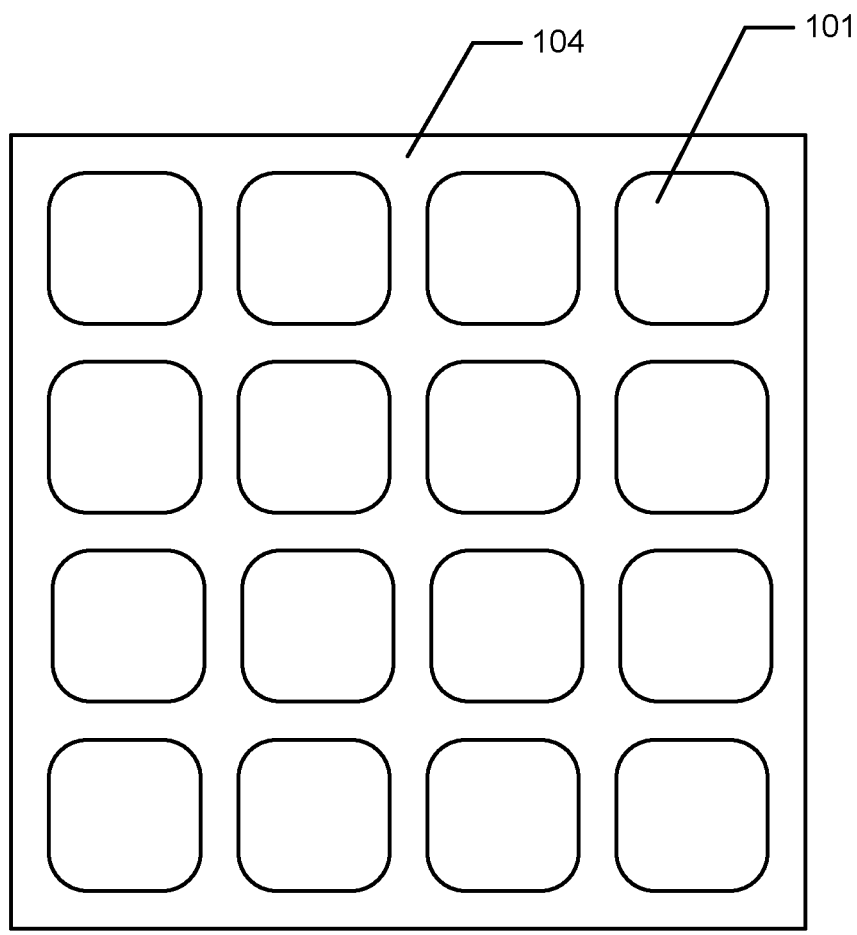
FIG. 1 shows an example of a platform according to the present system.

FIG. 1a) shows the platform as a Network-on-Chip (NoC) 104 on which a number of cells 101 are arranged.

Figure 1B:
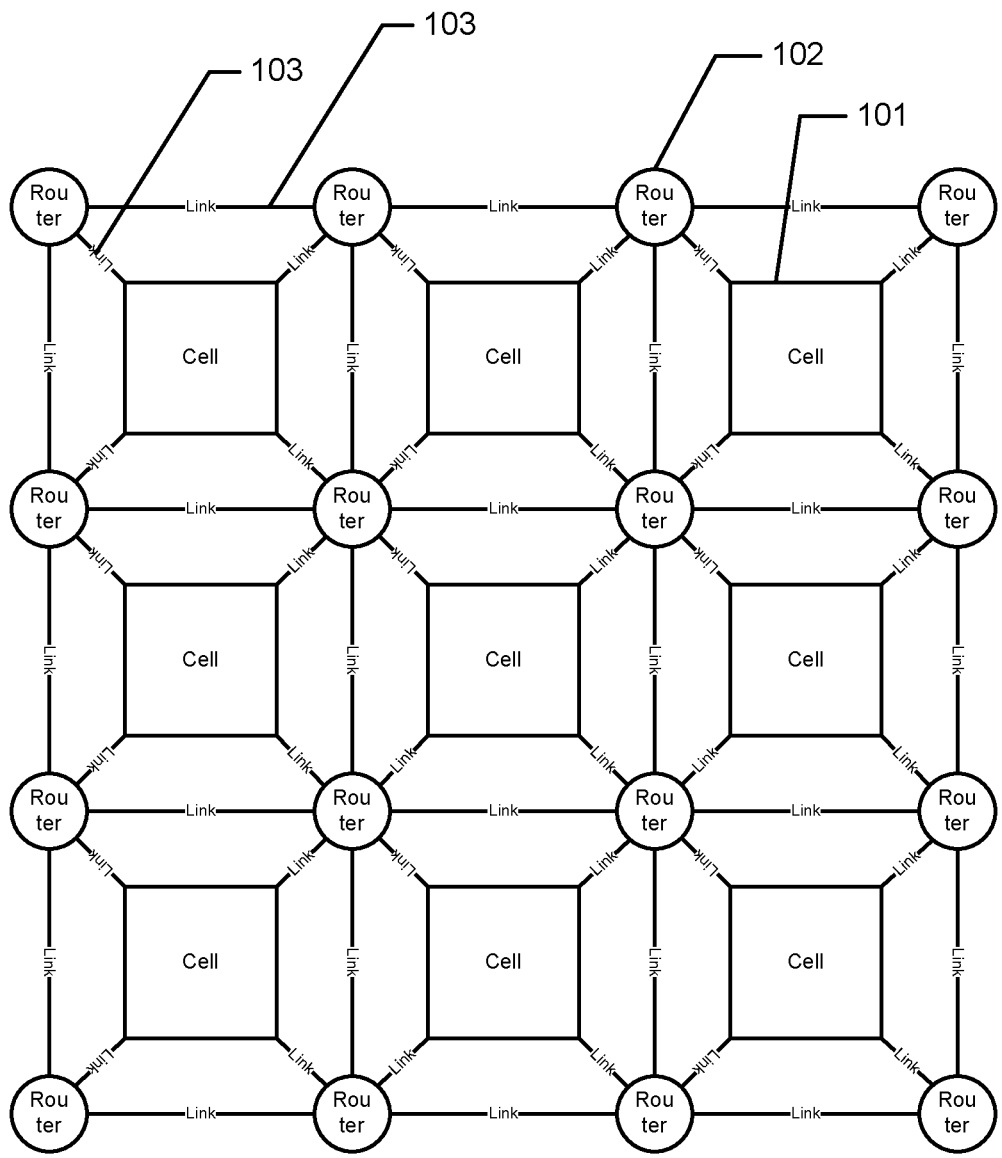

FIG. 1b) shows the platform comprising the number of cells 101, a number of routers 102 and a number of links 103 connecting the cells 101 and the routers 102. The cells are processing units, each of which is able to perform a number of mathematical operations and translate the DNA programming language into the hardware blocks shown in FIG. 4. The cells may also be denoted as computation units, heterogeneous computation units and or the like. The cells 101 may be reconfigurable. Each cell 101 is adapted to communicate with a number of other cells 101 on the platform. This may be accomplished by using the routers 102. Each cell 101 is connected to one or more routers by means of one or more links 103. Additionally each router 102 may be connected to on or more other routers 102 by means of one or more links 103. Thus the routers 102 and the links 103 provide communications means between the individual cells 101. A router 102 may perform routing and forwarding of data and information. A link 103 may be a wire by which data and information can be sent between a cell 101 and a router 102 or between a router 102 and a router 102.

The NoC topology shown in FIG. 1 is a 2D-mesh, however other designs of the communications medium can be used as well, e.g. a cluster-based 2D-mesh, 2D-hypermesh, 3-ary 2-cube platform etc. The NoC may be defined as a data medium, which uses routers or switches to transport data between nodes, where nodes may be the cells and/or the routers of the network.

DNA in biology is the blueprint of all organisms. Likewise, electronic DNA is defined as the blueprint of all hardware organisms. A hardware organism is defined as the application which is to be implemented. The electronic DNA in the present system provides an easy-to-understand way of programming the device for the programmer and the underlying hardware platform exploiting it. The DNA may be easy to understand for the programmer because it takes the form of a pseudocode-like programming language. The Backus Naur Form (BNF) notation of the DNA language may look like this:

```
dna        ::= <statement>* | <parallel>*
statement  ::= <assignment> | <while> | <if> | return <var>
parallel   ::= parallel <statement>* endparallel
assignment ::= <var> = <exp>
while      ::= while <bexp> do
               <statement>* endwhile
if         ::= if <bexp> then
               <statement>* else
               <statement>* endif
exp        ::= <var/c> [<op> <exp>]*
bexp       ::= <var/c> [<bop> <bexp>]*
op         ::= AND | OR | XOR | NOR | XNOR | NAND | + | − | ...
bop        ::= AND | OR | XOR | NOR | XNOR |
               NAND | < | <= | == | !=
var        ::= Letters{A-Z}* | RAM <var/c>
var/c      ::= Letters{A-Z}* | <const>
const      ::= Numbers(0-9)*
```

All logical operators are bitwise, and the logical operators in the <bop> assume a 1-bit input. Note that no for loops are present. This is because a for loop is a special case of a while loop, and it may thus be unnecessary. By using this DNA the programmer can fast and easy create applications to run on the platform.

All the programmer has to do is to write code using the above DNA language and the cells will take care of the rest.

Figure 2:
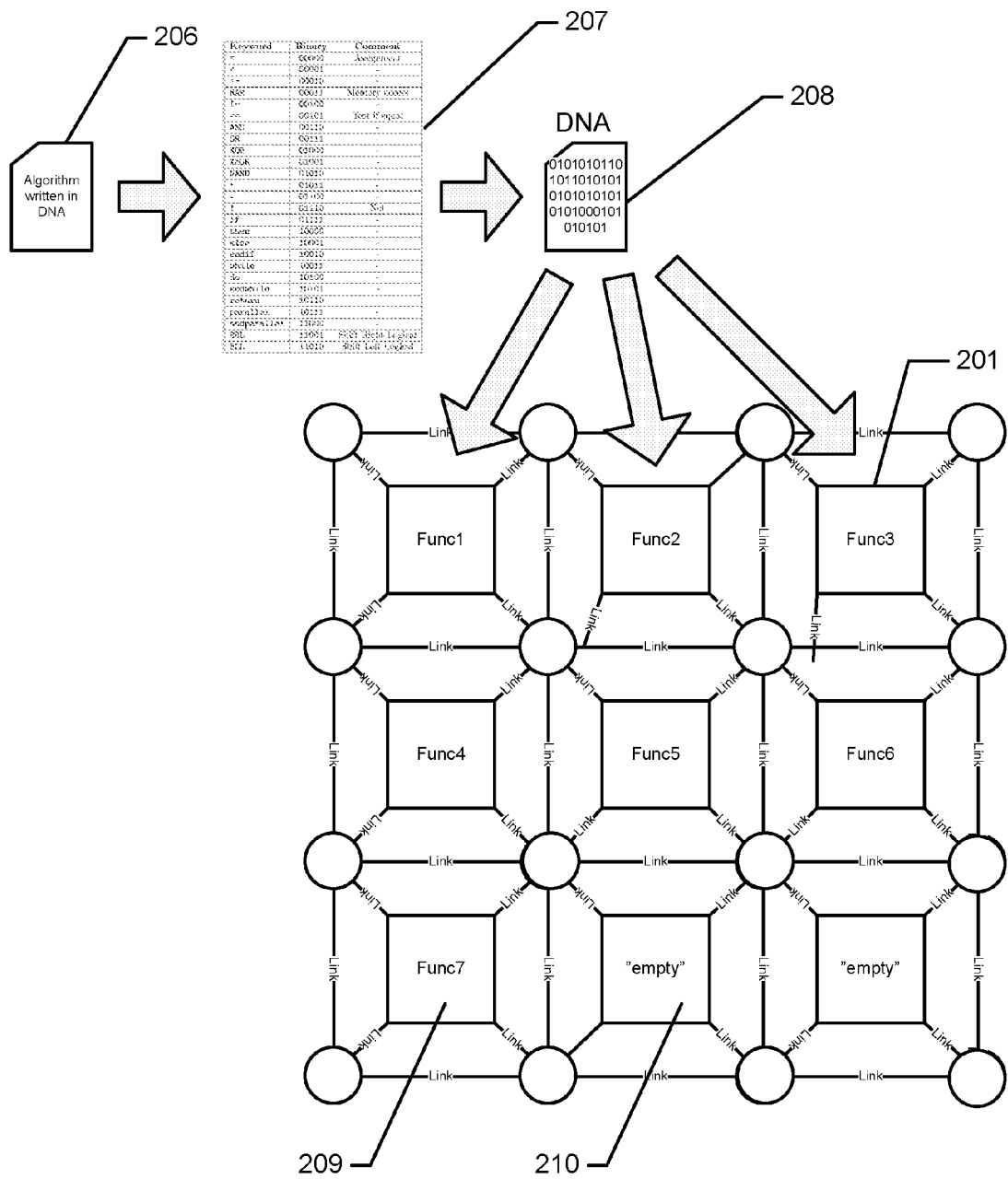
FIG. 2 shows an example of how DNA code may be transmitted to the cells.

FIG. 2 shows an example of how "DNA" code may be transmitted to the cells.

An algorithm 206 is written in the "DNA" programming language. The algorithm 206 can then be transformed into binary "DNA" code 208 by means of a converter program 207. The conversion of the algorithm 206 into binary "DNA" code 208 enables that the hardware can interpret the code. The "DNA" code 208 may then be transmitted to the cells 201 on the platform, and the individual cells 201 find their respective function in the algorithm 206. In FIG. 2 seven of the cells 201 are shown to have got a function "Func1", ..., "Func 7" 209 from the transmitted "DNA" code, and two of the cells are shown to be "empty" 210. These empty cells are cells in the platform which may be used for self-maintenance, if a fault occurs e.g. a cell dies.

The DNA may be easy-to-understand for the underlying platform, i.e. the cells, because of the translational model the cells may use to interpret the DNA. An example of a way to translate software code into hardware blocks is seen in FIG. 4, where different types of code and how it is translated is presented.

Figure 4:
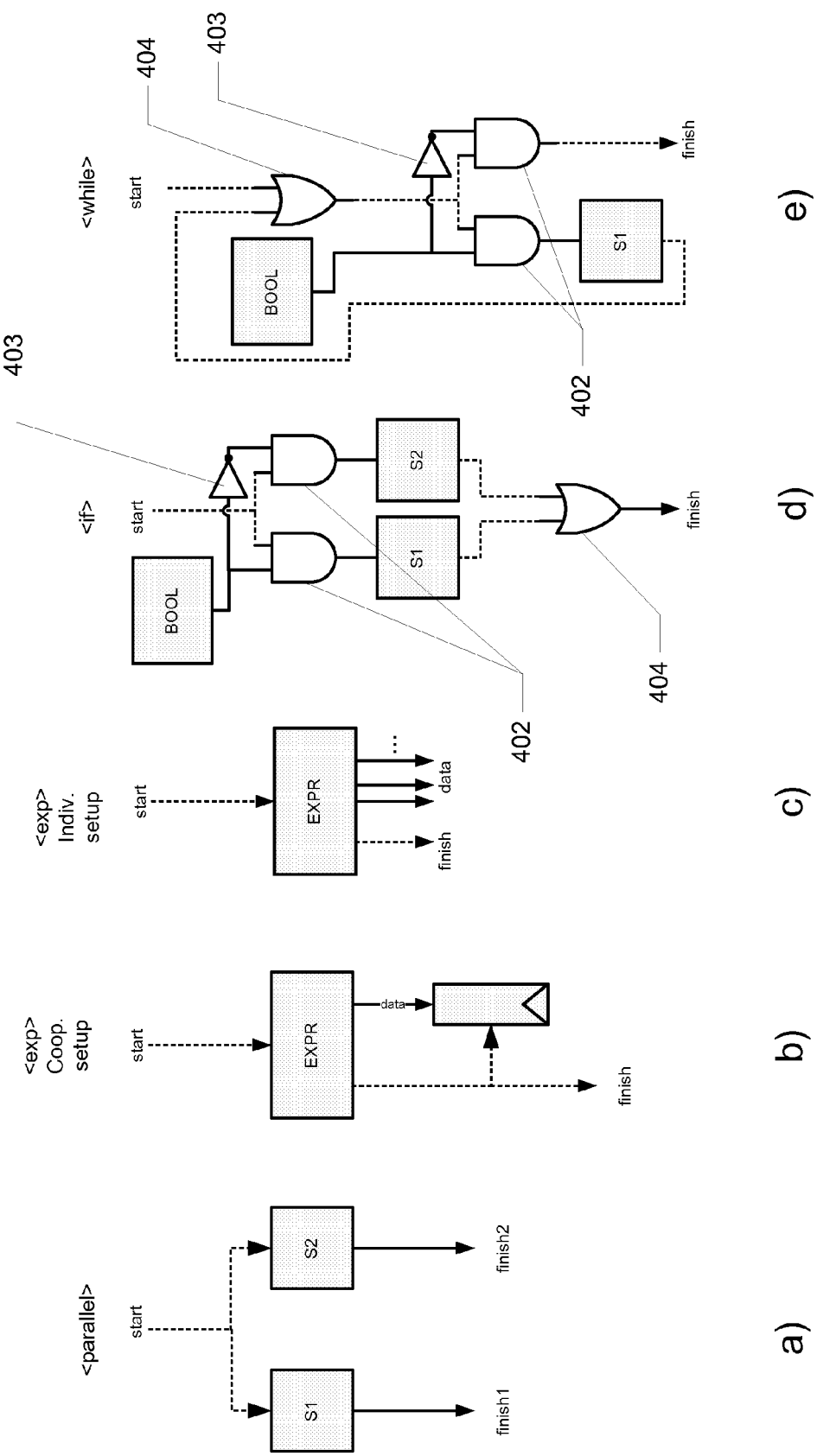
FIG. 4 shows an example of how DNA programming language structures are translated into hardware blocks.

FIG. 4 shows examples of how software code can be translated into hardware blocks.

FIG. 4a) shows how parallel processing may be implemented in hardware. Two statements S1 and S2 are initiated by the same start signal "start", thereby achieving the parallel processing, whereby two finish signals, "finish1" and "finish2", are generated.

FIG. 4b) shows an example of how a mathematical expression can be implemented according to the co-operative setup. A start signal "start" initiates the process and the result from the expression "EXPR" is transferred to the register and a finish signal "finish" is created.

FIG. 4c) shows an example of how a mathematical expression can be implemented according to the individual setup. A start signal "start" initiates the process and the result from the expression "EXPR" is transferred as a number data outputs "data", and a finish signal "finish" is created.

FIG. 4d) shows an example of how an if statement can be implemented. By means of two AND gates 402 and a NOT gate 403 it is determined how the expressions in S1 and S2 should be evaluated. The guard takes as an input, a start signal "start" and an output from a Boolean expression "BOOL". The finish signal "finish" is controlled by one OR gate 404. The finish signal may be the signal coming from either S1 or S2.

FIG. 4e) shows an example of how a while statement can be implemented. By means of two AND gates 402, an OR 404 gate and a NOT gate 403 it is determined if and when the expressions in S1 should be evaluated. An output from S1 is used as input signal together with the start signal "start", the Boolean expression "BOOL" provides an output signal and a finish signal "finish" is outputted.

The start/finish signal may act as a sequencer that makes sure that the order of execution is kept. It is easy to get from the DNA to these hardware blocks by performing the following steps:
  Identify type of statement, i.e. assignment, if or while;
  Place the block associated with the type of assignment.
How the blocks are placed can, however, be done in many ways as will be explained in the following sections.

Thus the cells implement different functions, and these so called cell-types may be EXPR, BOOL, IF-G (if-guard), W-G (while-guard) and PAR. The EXPR and BOOL implements the <exp> and <bexp> part of the eDNA language also seen as the EXPR in FIG. 4a) and the BOOL in FIG. 4b)-c). The IF-G and W-G are the parts on FIG. 4 b)-d) marked by the dashed box called guards. Finally, the PAR is the cell type that is responsible for joining two parallel parts of the code. The BOOL cell-type may be integrated in IF-G and W-G in order to save cells and wiring.

Figure 3:
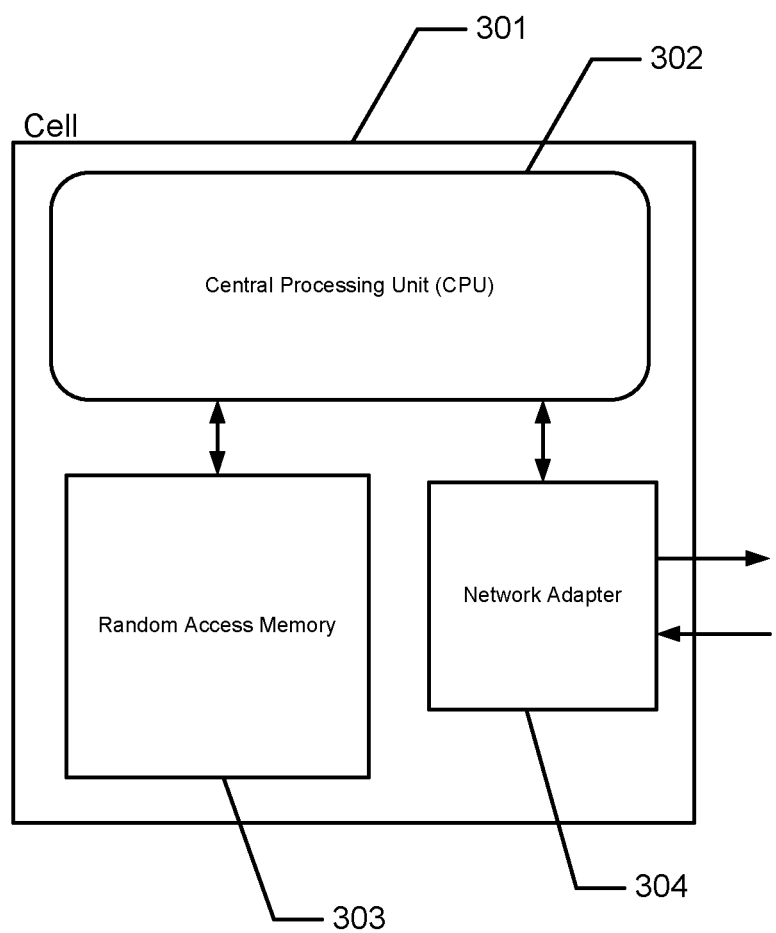
FIG. 3 shows how a cell may be organised.

FIG. 3 shows how a cell may be organised. The cell 301 may comprise a central processing unit 302, which may perform processing tasks dictated by the DNA code; a random access memory (RAM) 303 for storing the instructions from the DNA code as well as algorithms controlling the cells, either using cooperative or individual setup; and network adapter 304, which is an interface unit used for communicating with the other units in the network, e.g. routers and other cells.

The hardware cell is a small processor, which is capable of interpreting the DNA provided to it as well as handling information provided by other cells. The control of the cell is handled by algorithms, which may be expressed as simple instructions located in a storage. The cell is reconfigurable in the sense that it contains an ALU, which can perform some mathematical functions. Which function it performs is dependent on a select-signal. By changing the value of this select signal it may be possible to reconfigure the cell to perform another function for the hardware platform. This may give a definite number of mathematical functions which the cell can express. It is the cells which have the responsibility of implementing the behavior specified by the DNA. This can be done in many ways. The cells according to this system implement it in a functional way. This way the ALU of the cells contain higher level functions, such as "add", "logical shift", "comparators" etc.

Apart from the processor and the ALU, the cell may also contain a unit which handles the interface between the cell and its environment.

In order for the cells to communicate with each other they may need to be connected by some kind of medium. The medium may be a network-on-chip. Therefore the interface unit may be a network adapter, which handles the communication with the nearby router. The topology may e.g. be a simple 2D-mesh.

The self-organisation is the feature in the system, which reconfigures the platform and makes sure it is ready to execute the function specified by the DNA. The self-organisation may be entirely controlled and performed by the cells and no user intervention may be required. Furthermore, the self-organisation may be a distributed process, as opposed to being controlled by a centralized "oracle", and the risk of having a single-point-of-failure is therefore eliminated.

Many ways of implementing self-organisation exists. Two methods will be described in the following. Some steps of the self-organisation are common for both methods. The following basic algorithm for the self-organisation is described from the point-of-view of a single cell in the system:
  Receive the DNA;
  Save it in memory;
  Perform self-organisation, which is not common for the two methods;
  Determination of whether "I am last", and if this is the case, then notify relevant parties that the self-organisation is done;
  Start executing.
In the self-organisation step the cell may have to determine the following:
  Its function, e.g guard, operator, RAM etc., which is abbreviated func below;
  The coordinates of which cells the cell shall send its outputs to, which is abbreviated outs below;
  Auxiliary variables which are needed for self-maintenance, which is abbreviated aux below.
The two methods are described in the following are defined as:
  Co-operative setup: The cells co-operatively exchange information concerning the system. Information such as "I am here, please send your output to me" etc.;
  Individual setup: The cells are able to deduct all information from the DNA, except notifications of cell deaths. A cell death is defined as a fault in the system.
The two methods are described in detail in the following.

First the individual setup is described:

All information which may be needed is directly deduced from the DNA, i.e. the DNA program described for example by the BNF notation of the language disclosed earlier in the description, in the individual setup, as opposed to the co-operative setup, in which other cells helps to provide the information. The object of the individual setup may be: why rely on the functionality of the network of cells (NoC) and the other cells, when the same functionality can be achieved when each cell is itself responsible for its own setup. An important difference between the individual setup and the co-operative setup is that the individual setup does not use registers, thus eliminating the effect of having a slow data pull protocol at runtime. The individual setup may be characterized by these algorithms:

```
Algorithm void selfOrganisation(DNA dna, Coord id){
    int MyNr = getCellNr(id);
    func = find_gene(MyNr,dna);
    setFunc(func);
    determine_outputs(func,dna);
    determine_GS_source(id,dna,func);
}
```

```
Algorithm String find_gene(int nr,DNA dna){
    int dnai = 0;
    int count = 0;
    ignorevars.clear( );
    ignoreRAM = false;
    while (dnai < dna.getTotalGeneNr( )){
        gene d = dna.getGene(dnai);
        String kw = d.getContent(0);
        boolean ignore = ignorekw(kw);
        if (!ignore && count == nr){
            return kw;
        }
        else{
            if (!ignore){
                count++;
            }
            else{
                ignoreCount++;
            }
            dnai++;
        }
    }
    return "?";
}
```

```
Algorithm void determine_GS_source(Coord id, DNA dna,String func){
    while(dnai < dna.getTotalGeneNr( )){
        dnai++;
        Gene d = dna.gene(dnai);
        String t = d.getContent(0);
        boolean ignore = ignorekw(t);
        if (!ignore){
            if (!Constants.convertToString(t).startsWith("var") &&
                    !t.equals(Constants.RAM) && dnai == genenr){
                // Request startsignal from the input environment (IE)
                OutputReqPayload orpl = null;
                if (func.equals(Constants.IF) || func.equals(Constants.WHILE)){
                    orpl = new OutputReqPayload("GS","p1");
                }
                else{
                    orpl = new OutputReqPayload("GS","p3");
                }
                ID IE = new ID("IE",-1,id.getY( ));
                Packet[ ] ps = {new Packet(1,new Destination(IE),
                        new Source(id),orpl)};
                sendPackets(ps);
                // Orders inputenvironment to provide the GS now
                StartPayload spl = new StartPayload( );
                Packet[ ] ps2 = {new Packet(2,new Destination(IE),
                        new Source(id),spl)};
                sendPackets(ps2);
                break;
            }
            else if (!Constants.convertToString(t).startsWith("var") &&
                    !t.equals(Constants.RAM) && dnai != genenr){
                break;
            }
        }
    }
}
```

The purpose of the find_gene algorithm is to use the cell number assigned to the cell to locate in the DNA, the gene that this cell shall express. This may be done by searching the DNA from the start and for each gene determine whether that gene is "expressable". This resembles the RNA polymerase in the biological protein synthesis. A gene may be expressable if it is:

One of the keywords: while, if, endif;

The first occurrence of RAM;

Any operator.

Each time an expressable gene is found, a counter may be incremented by one. When the counter equals the cell number of the cell, the gene which the cell shall express is found.

The purpose of the determine_GS_source source is to determine whether this cell shall get the start signal from the input environment, and that is thus not from another cell. This may be the case if the gene which the cell expresses is the first expressable gene in the DNA or inside a <parallel> block.

The determine_outputs(func) is more complex than the others, and it is therefore explained and not written in pseudo code. The purpose of it may be to analyze the algorithm described by the DNA and deduct the correct outs as well as setting the aux. The DNA language may contain four statement types, see <statement> in the DNA language:

<while>;

<if>;

<assignment>;

return <var>.

The <while> and <if> statement are quite similar and only <while> will be explained. In the following, see FIG. 4 for details.

The first cell which reads the while statement may be a while-guard. This while-guard shall make sure to receive the start signal from the preceding statement—which the preceding statement takes care of—and receive the result of the Boolean expression—which the Boolean expression takes care of—and finally it may provide its start signal to the statement contained in the while statement and the statement just after the while statement. By computing how many cells the Boolean expression occupies it may be able to link its output to the statement contained in the while statement, as well as the statement just after the while statement.

The Boolean expression—after the while keyword in the DNA—may make sure that it provides the output of it to its associated guard. This is very easy because it is the cell just before the beginning of the Boolean expression and thus easy to calculate and save in outs.

Assignments may be a little more complex. In order to create an assignment each expression may send its output to all cells which needs the variable which it computes. These coordinates may be easy to find, since it may be a matter of reading the DNA and linking the outputs to the expressions which contains the variable which this expression computes, thus it may resemble a language parser. Furthermore, the expressions may also send their output out of the system if the variable it computes is in one of the return <var> statements.

In the following the co-operative setup is described.

In the co-operative setup the cells help each other organising the system. The object of this method is that if more cells co-operatively help each other with establishing func, outs and aux there may be a higher chance that more of them will be correct, as well as addressing the problem what if a deduction is wrong? The basic idea of co-operative setup is the same as individual setup, namely that the cell first have to determine its function. This can occur in two ways—either as (i) a "semi"-deductive process by the cell itself or (ii) because it is ordered by another cell. (i) The semi-deductive process is called "semi", because the preceding cell may send a packet to the cell telling it from where it shall read the DNA, thus the deductive process is actually a result of multiple cells analysing the DNA. Furthermore, according to (ii) a cell can also receive an order telling it to differentiate into a function, where the function is specified in the order. This may for instance occur, when an if or a while statement is read by the preceding cell, and then the preceding cell may send a Boolean expression packet ordering the receiving cell to differentiate into the Boolean expression described in the packet. Opposed to the individual setup, the cells in the co-operative setup may only be partly responsible for the differentiation of their own function as well as sending/receiving packets to/from other cells. Depending on the type of the cells, the cells may also send output-request packets to other cells, which request the output of the receiving cell. This can for instance be a statement inside a while statement, requesting the start signal from the while-guard. The cell inside the while statement knows where the while-guard is because this information is saved in the packet which "creates" the statement. Thus the cell will not have to deduct a lot from the DNA, but rather from the packets received. Note that upon reception of an output-request, an input notification packet may be sent back to the source of the packet, such that the output requester also may keep track of which inputs it gets, thus creating an "input-output-information redundancy", which may be used during self-maintenance. In this way it is the other cells, which are responsible for requesting and sending information to/from other cells.

The purpose of the self-maintenance is to maintain the application the system implements. This may involve two phases:

(1) detect a fault; and
(2) correct it by reprogramming available parts of the system.

The first phase (1) may be totally hardware dependent and may rely on built-in self-test techniques and data integrity tests. The second phase (2) may be controlled by algorithms contained in the cells, and will be explained in the following.

FIG. 6 shows how self-maintenance can be performed. Each cell in the network has a cell number, e.g. "Cell 1", a coordinate point which can also be denoted an address, a location, a position etc. The network is shown as a 2D-mesh. The coordinate point in this 2D-mesh is in the form of a point denoted by (row, column), where "row" indicates which row number the cell is placed in, and "column" indicates which column number the cells is placed in. "Cell 1" is e.g. placed in the coordinate point (0,0) on the platform. Other platform shapes and address schemes could also be used. The individual cells may implement a function "Func" or may be empty.

FIG. 6a) shows how the system may work prior to a fault in the form of a cell's death, and FIG. 6b) shows how the system may work after self-maintenance has been performed. In FIG. 6b) it is seen that the cell in the coordinate point (0,2) has died. Before the cell died, this cell was Cell 3 in FIG. 6a). After the cell is dead, it has no cell number anymore as seen in FIG. 6b). Instead the cell which is positioned just after the dead cell, i.e. the cell in the next coordinate point, gets the cell number the dead cell had when it was alive, i.e. Cell 4 in FIG. 6a) is now Cell 3 in FIG. 6b). All the subsequent cells, i.e. cells with higher coordinate points, will also be renumbered with the cell number with the cell just before had. I.e. Cell 4 in FIG. 6a) is Cell 3 in FIG. 6b) etc. The function "Func" of a cell changes together with the change of cell number, i.e. the new Cell 3 in FIG. 6b) also inherit the function "Func 3" from the old Cell 3 in FIG. 6a). The empty cells, Cell 7, Cell 8 and Cell 9 in FIG. 6a) may therefore be recruited to be cells having a function after the Cell 3 in FIG. 6a) is dead. The old, empty Cell 7 in FIG. 6a) is the new Cell 6 in FIG. 6b) and it therefore inherits the function "Func 6" of the old Cell 6 in FIG. 6a). Thus the cells positioned before the dead cell maintain their cell number and function, where as the cells positioned after the dead cell decreases their cell number and function number by one.

The second phase (2) will be explained in the following regard to the individual setup and the co-operative setup, respectively.

First it will be explained in relation to the individual setup. One of the advantages about the individual setup is that it uses the exact same algorithms to control self-maintenance as the algorithms used to control self-organisation, as opposed to the co-operative setup, which uses a different set of algorithms to control the self-maintenance. This means that the individual setup may require a smaller storage to hold the algorithms. If a fault is found, the routers may alert the input environment about this, which may then send a cell death-signal to all cells, notifying that a cell death has occurred. The cells may quickly calculate whether they are located before or after the dead cell, following the growth pattern. A growth pattern may be defined as a rule, which determines how the algorithm is placed on the platform. If a cell is located after the dead cell it may increase deadcell counter, which may be used by the getCellNr(id) function in the selfOrganisation algorithm, and this restarts the self-organisation algorithm. Updating the deadcell counter has the effect, that cells which are located after the dead cell automatically gets a cell number which is one less than the number it had before. This means that it will get the function as its neighbor just one cell behind had, thus copying itself in an extremely easy, fast and cheap way. The dead cell remains in its location, whereby the coordinate point it has continues to belong to the dead cell. So the cells located after the dead cell get a new cell number which is one less the number they had before, but all the cells remain in their coordinate point. Thus the cell number and thereby the function of a cell located after the dead cell is increased by one coordinate point.

If a cell is located before the dead cell it checks its outs to see if any of the coordinates contained in its outs points at or after the dead cell. If this is the case, the cell located before the dead cell updates by increasing the coordinate point its outs is pointing to by one, whereby the increase in coordinate point relating to cell number, for cells located after the dead cell, is taken into account. So by this the system has healed itself.

If the cells are located in a 2D mesh, they may have coordinates like (0,0); (0,1); (0,2) . . . in the first row, and coordinates like (1,0); (1,1); (1,2) . . . in the second row and so on, i.e. the first coordinate corresponds the row number and the second coordinate corresponds to the column number, where the first row number and first column number are indicated by 0. See FIG. 6.

Now the self-maintenance is described in relation to co-operative setup. The beginning of the self-maintenance algorithm may be the same for the individual setup and co-operative setup, namely that the routers surrounding a dead cell discover that the cell is dead and alert the environment. In this algorithm, the routers may send cell-death packets to all cells before the dead cell and to one of the cells after the dead cell. The cells before the dead cell may do the exact same as for the individual setup, with two additions (a) and (b) however. Which is, (a) that whenever they come across a coordinate contained in outs, which is the coordinate point of the dead cell, it may, in addition to increasing the coordinate point by one, send an input-notification packet to the updated coordinate point, i.e. to the cell which has undertaken and inherited the function of the dead cell, so the input-output list information redundancy can be kept. And (b) a cell before the dead cell may also search its input-notification list doing the same as it does with the outs, except that if it finds the coordinate point of the dead cell in its list, it may send an output request to the updated coordinate point, instead of an input notification.

The cell just after the dead cell may calculate which function the dead cell had, e.g. by using an approach resembling that of the individual setup. Once the function is calculated, the cell just after the dead cell may save this result and then copy itself to the next cell following the growth pattern, e.g. by creating and sending a copy-packet which contains the relevant variables. Then the cell just after the dead cell may finally differentiate to the function it just calculated. A cell which receives this copy packet may copy itself to the next cell and read the copy packet it receives.

In the following it will be described how and where the system may be used. The system is a reconfigurable platform, like an FPGA and can be used in nearly the same way. An FPGA requires a synthesis or compiler tool in order to map the Hardware Description Language (HDL) to the Configurable Logic Block's (CLB's) of the FPGA. For very big designs this is a very time-consuming process. In contrast, the present system only requires a small converter program, which can take a keyword from the DNA and translate it to the corresponding binary code. The converter software uses the table in FIG. 9 to convert the keywords from the DNA to a binary code.

Variables may get encoded with values higher than the highest in the table in order to ensure that no keywords and variables have the same value. Furthermore, the converter software may also contain an interface, which can copy the DNA from a PC to the cells, as well as a cable connecting a PC and the hardware platform.

A person working with the platform may do the following steps in order to use the platform:
Write the algorithm(s) he/she wishes to implement on the platform in the DNA language;
Use the converter software to convert the DNA to a binary DNA;
Load the DNA onto the platform also using the software.
Thus, the steps is a design cycle which may be quite similar to working with an FPGA, but there is a number of distinct differences between a FPGA and the present system:
It is much easier to write an algorithm than to write a detailed HDL model;
The conversion process is faster than the synthesis process;
The load process according to the present system cannot be slower than the FPGA, since they are of related complexity.

In the following different properties of the syntax of the DNA is described. The electronic DNA syntax can be specified like this:

```
dna         ::= <statement>* | <parallel>*
statement   ::= <assignment> | <while> | <if> | return <var>
parallel    ::= parallel <statement>* endparallel
assignment  ::= <var> = <exp>
while       ::= while <bexp> do
                <statement>* endwhile
if          ::= if <bexp> then
                <statement>* else
                <statement>* endif
exp         ::= <var/c> [<op> <exp>]*
bexp        ::= <var/c> [<bop> <bexp>]*
op          ::= AND | OR | XOR | NOR | XNOR | NAND | + | − | ...
bop         ::= AND | OR | XOR | NOR | XNOR |
                NAND | < | <= | == | !=
var         ::= Letters{A-Z}* | RAM <var/c>
var/c       ::= Letters{A-Z}* | <const>
const       ::= Numbers(0-9)*
```

The electronic DNA resembles an ordinary programming language with traditional programming constructs or standard structures such as "while", "if", "assignments", "return statements" etc. The standard structures are well-known to a person skilled in the art. However, return statements are interpreted differently in the electronic DNA programming language as compared to a software programming language. The cells in the system interpret a return statement in such a way that the variable in the "<var>" part of the return statement should be sent out to one of the outputpins of the systems.

There are two types of expressions, "exp" and "bexp", which are expressions and Boolean expressions, respectively. The difference between these two is that the Boolean expressions can take Boolean operators, and the expressions can take numerical operators.

A new programming structure is introduced with the electronic DNA, and this is the "parallel" statement or syntax.

A <parallel> syntax may be included. This makes it possible to execute independent parts of the application in parallel in order to speed up the application. The system becomes faster with the parallelism, at least when concerned with speed. This <parallel> syntax may also allow the cells to grow these parts marked by the <parallel> in parallel, thus also speeding up the self-organizing process. This may change the general behavior of the system, since the platform may now be able to run independent applications.

A number of operators may be included in <op>. The cells implement a function on a much higher level of logical granularity than gate-level function. This may have a big impact on the area and power usage of the system. Thus, the hardware platform may be very interesting seen from a "in real life" applications point-of-view.

A RAM may be included whereby the cells may be able to handle complex memory functions, such as for instance array operations, whereby the hardware platform may be enabled to perform a lot of other applications. This may also have an impact on the way the cells interpret the DNA, because it may also be possible to use dynamic addressing, which may be an addressing, where a register, which do not have a static value, is used as address.

According to the present system the cells interpret the DNA in a functional way. However, cells could also interpret DNA in a structural way, whereby the cells can structurally place each and every bitwise unit of a given functional unit.

When the cells interpret the DNA in a functional way, they may place the functions as one cell. This means that each function the DNA can express is placed in one cell, instead of in several cells. This may have a big impact on the algorithms controlling the interpretation of the cells, since it may be extremely complex and thus costly to assemble a big expression bitwise.

The algorithms can take multiple <statements> of the type <if> and <while>.

The guardian circuitry may be collected to one guard cell, whereby the overhead associated with guard cells is minimized compared to if a guard cell consisted of 4 cells performing one gate of the total guardian circuitry. By only using one cell as guard cell and not 4 cells, there is a saving of 3 cells pr. if- and while-statement.

Figure 5:
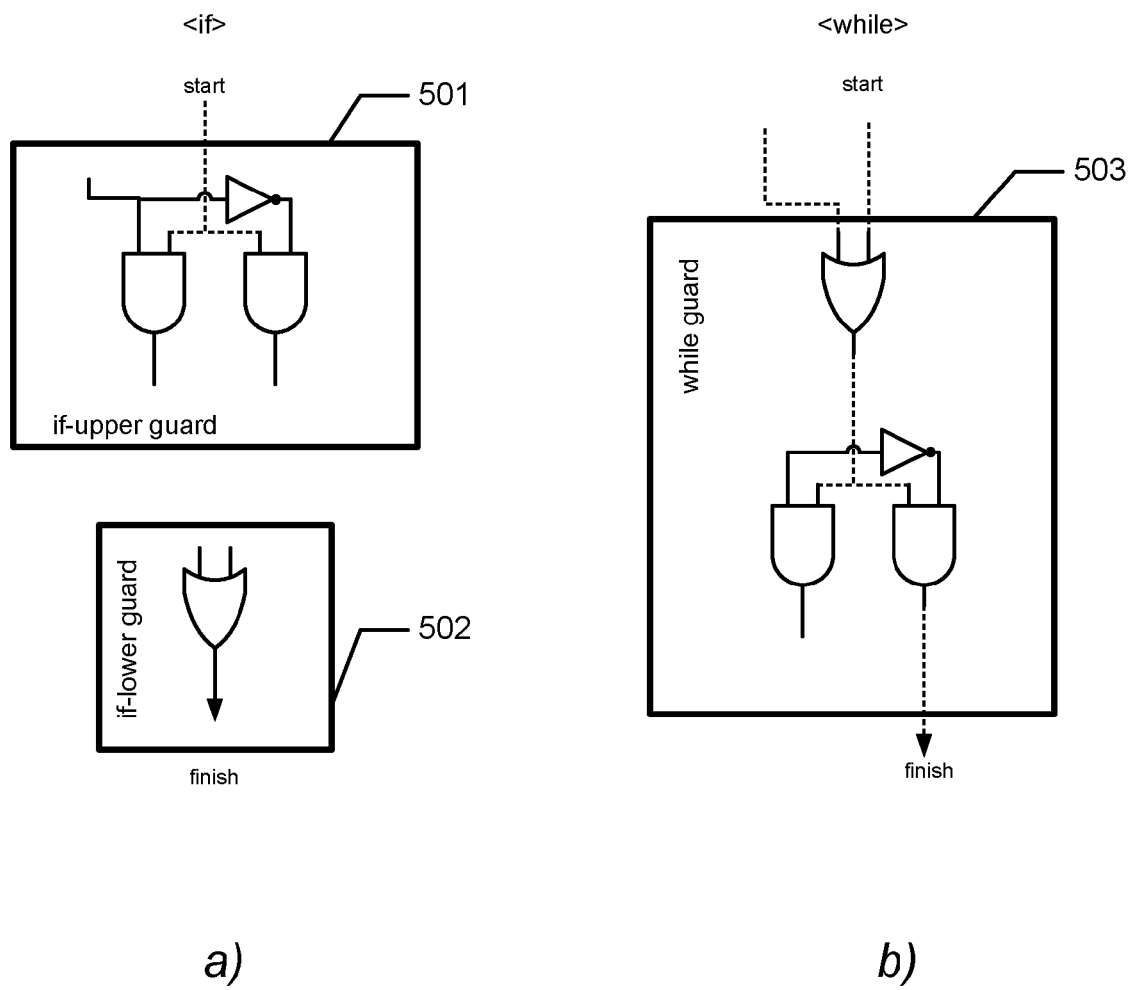
FIG. 5 shows how cells can implement guards.

FIG. 5 shows how cells can implement guards. In FIG. 5a) one cell 501 may implement an if-upper guard and one cell may implement an if-lower guard. In FIG. 5b) one cell implements a while-guard.

It is understood that higher or lower level of granularity may be used in the present system.

In the following the NoC topology is described. Studies have shown that too much time is spent transporting data from cell to cell in the network. A way to optimize network traffic may be to optimize the NoC topology. FIG. 1b shows an example of a 2D-mesh topology.

Instead of each cell having one router each, then a group of cells may share the same router with which they can communicate with other cells, thus the cells are located in a so called cluster. This may have several benefits:

Cell deaths may be easy to handle if there are available cells in a cluster;
The network may be smaller, thus saving area and power;
Shorter organ-to-organ data transport delay, since the data does not have to "pass through the organ itself", where an organ may be defined as an organization of cells.

In the following the individual setup DNA interpretation scheme is described. According to this the cells behave like a language parser. This means that only DNA may be used for initializing and repairing the system. Thereby responsibility is moved from the NoC to the cells, as opposed to a system where the cells together organizes the system, by sending information between each other, which informs the cells about certain events in the system. But this information can be deduced fully from the DNA and one single other information, namely, how many cells have died. Thereby self-repair may only be a question of notifying all active cells that a cell has died and then rerun the self-organizing process with the updated cell-death counter. In this way the cells may automatically gain the information which in a different scheme, e.g. co-operation, must be carried around the network in packets. This individual setup interpretation scheme may e.g. be possible because of the high level of logical granularity.

Several factors may have impact when writing algorithms with the DNA. One of the things which may have an impact on the performance of the algorithm to be implemented is where the registers and RAM are placed, which is relevant for the cooperative setup. A placement decision may be concerned with at what point in the DNA code the register or RAM is introduced. A DNA optimization program may be implemented in order to optimize big algorithms.

Figure 7:
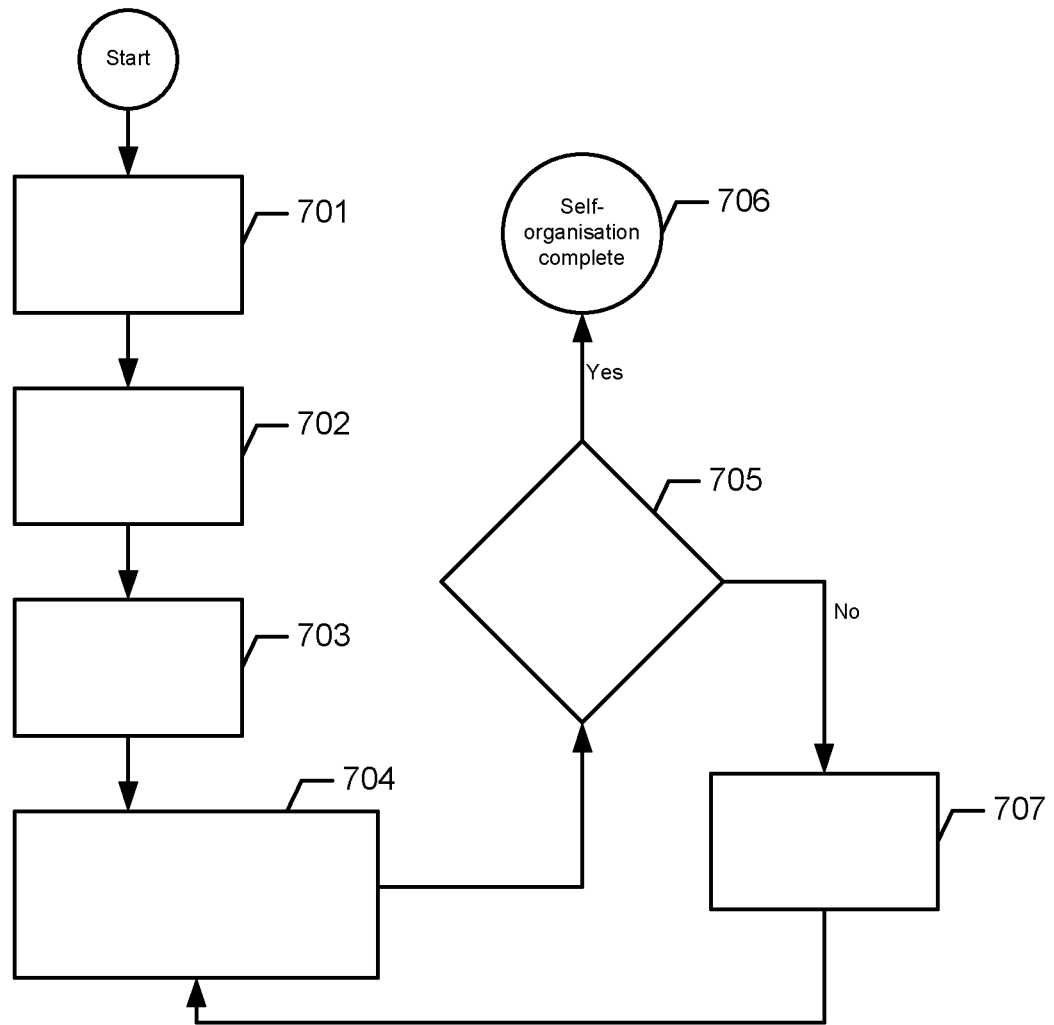
FIG. 7 is a flowchart showing how the self-organisation can be performed.

FIG. 7 is a flowchart showing how the self-organisation can be performed.

In step 701 an algorithm is written using the DNA programming language.

In step 702 this DNA is translated into binary code.

In step 703 this code is send to at least one cell in the platform.

In step 704 the DNA code is received by a cell and the DNA code is analysed by the cell to determine which function of the DNA the respective cell shall express and which cell(s) it shall provide its output to based on a cell ID.

In step 705 the system examines whether the DNA is received by a sufficient number of cells.

In step 706 the self-organisation is determined to be complete, if a sufficient number of cells had received the DNA.

In step 707 DNA is send, by following a distribution pattern, to a cell which have not already received the DNA, if a sufficient number of cells had not received the DNA.

Figure 8:
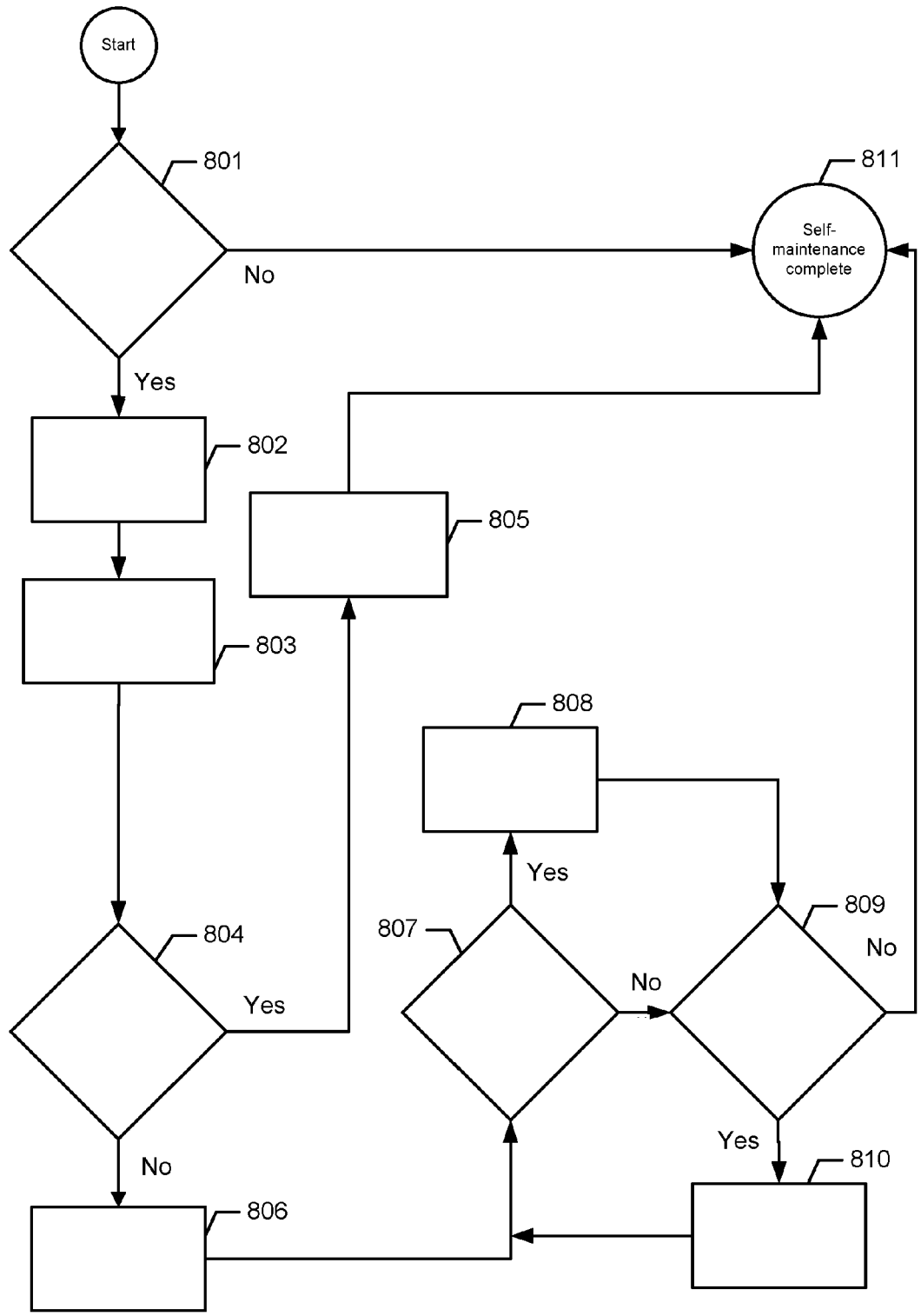
FIG. 8 is a flowchart showing how the self-maintenance can be performed.

FIG. 8 is a flowchart showing how the self-maintenance can be performed.

In step 801 it is examined whether a cell fault is detected.

In step 802 a cell stops acknowledging watchdog from router, if there is a cell fault in this cell.

In step 803 the router relays a celldeath-packet to all cells, where this packet contains the ID of the dead cell.

In step 804 all cells determine based on the ID of the dead cell whether their own cell ID is higher or lower than the dead cell ID.

In step 805 the cell ID is decreased by one, if the cell ID is higher than the dead cell ID and the self-organisation is restarted, se FIG. 7

In step 806 all output IDs are checked, if the cell ID is lower than the dead cell ID, where the output IDs are cell which this cell shall provide output to.

In step 807 it is determined whether the output ID is higher or lower than the dead cell ID.

In step 808 the output ID is increased by one, if the output ID is higher than the dead cell ID.

In step 809 it is checked whether there are more output IDs.

In step 810 the next output ID is also tested in step 807, if there were more output IDs.

In step 811 self-maintenance is complete if or when there are no more output ID when checked in step 809.

FIG. 9 is a table showing how a keyword from the DNA programming language can be translated to a corresponding binary code. In the first column the different keywords are seen, and in the second column the corresponding binary code for each of the keywords are seen. In the last column a description of what some of the keywords mean, is seen.

FIG. 10 shows examples of communication in prior art systems and in the present system in case of faults.

FIG. 10a)-b) show an example of communication in a prior art system, where the communication takes place between the cells. The network is fixed-wired, and communication is only possible between neighbour cells. Due to the static means by which communication takes place, if a fault, denoted by a cross, occurs in a cell with function F4, see FIG. 10a), both the cell F4 and the wire through cell F4 may be destroyed, as denoted by the crosses, whereby the communication in the system may becomes blocked and the system may thus be broken.

If the system undergoes self-healing, as seen in FIG. 10b), then the spare column, which is the rightmost column, overtakes the column with the faulty cell F4, and cells in the spare column are assigned the functions F4, F5 and F6. However, if the wires around the old faulty F4 cell were destroyed together will the cell, these wires are still broken, as denoted by the crosses in FIG. 10b), and hereby the communication to the healthy cell F4 is blocked due to the broken wire, as denoted by the cross.

FIG. 10c)-d) shows an example of communication in the present system. Due to the dynamic nature of the network in the present system, wire faults can be tolerated by rerouting packages.

In the present system the communication takes place between so called nodes, thus communication is possible between all cells, so if a fault occurs in a cell with function F4, as seen in FIG. 10c), the cell F4 and the wire to cell F4 may be destroyed, as denoted by the crosses, but since the nodes are connected with each other through many wires, the communication will just be directed someway around the faulty cell and its wire, when the system undergoes self-healing. As seen in FIG. 10d), a cell from the spare column, which is the rightmost column, is assigned the function of the faulty cell F4, and becomes the new F4 cell. As also seen in FIG. 10d) it does not block the communication that the wire at the faulty cell was also destroyed, since due to the nodes in the system, there is many paths between two nodes in the platform and thereby between the cells, and there will therefore most likely always be a different path between two nodes in the system, if one of the paths has been destroyed due to a faulty cell or wire. Thus the dynamic communication can occur due to the many wires, which connect nodes, whereby the communication flow can find an alternative path, if a wire on one of the paths is broken.

An example of a prototype that works in practice, but which is too simple to be used in a real implementation of the invention, will be described in the following. The hardware platform may be an MPSoC consisting of multiple Xilinx PicoBlaze soft cores connected by a Network-on-Chip interconnect.

The network adapter may consist of a pair of peripheral switches, which are set due to the desired position after handshaking, in which the switch receiving data confirms receipt of the transmitted data. Furthermore, the network adapter may include 6×8-bit registers, i.e. registers in the cell, that may be capable of storing a single datagram. A state machine may be used to handle signalling, package transfers, routing algorithm, triggering the CPU interrupt and controlling the register accesses.

In order to set up applications on a high abstraction level, a soft core CPU may be run on top of the network adapter. Due to the small resources requirement and its flexibility, the PicoBlaze may be an appropriate solution. The Xilinx PicoBlaze is based on 8 bit RISC architecture that is optimized in size for Virtex and Spartan series of FPGAs, and an FPGA is used here as a fast-prototyping platform to show that the chip-design and algorithms work in hardware. It may be provided as synthesisable source-level VHDL file which is easy to extend with additional ports to fit the desired application. There may be assembler and C compiler available for the PicoBlaze. For instance, a setup consisting of an array of 49 cells can be setup on a Digilent XUPV2P board.

The datagram size may be specified to 6×8 bit. This parallel architecture may require more connections between the cells but allows faster package transfers and keeps the overhead for package transfers low. In a setup it may take 14 clock cycles to transmit a data package to a neighbouring cell and invoke the corresponding CPU. Cells that route a package without the Picoblaze involved, may be occupied during 30 clock cycles to forward a package, which includes handshaking and receiving data, compute destination direction, handshaking and transmitting data.

The first 8 bit of the datagram may be used as package identifier which describes the content of the data, e.g. start/stop signalling, variable read/write etc. The 8 address bits may be split up in 4 bit X/Y-coordinates, the address space may therefore be limited to 225 cells, since 0 is no valid address, and this may be meaningful for implementations. The remaining 4×8 bit may be used to carry data.

Handshaking and "lifeline" signalling, which may be asserted when a cell is alive and not busy, may be used to ensure reliable package transfers.

The distributed logic electronic DNA or eDNA approach may create a significant overhead by transmitting data packages among the cells. In addition to the data exchange, the start/stop signalling may be implemented pure package-based and may generate additional traffic in the NoC. The prospective network should be able to forward packages in a simple and fast manner, since the performance of the whole system greatly depends on its properties.

The mesh-8 network may be a good compromise between used chip space and number of hops. In addition it may offer the possibility of implementing a simple and efficient routing algorithm. This topology may be plausible to fabricate since the number and length of connections on modern chips are no critical issue, moreover it would be feasible to parallelise the packet transfer even more to speed up the NoC.

Routing may work in a way such that when a network adapter of a cell receives a package, it checks whether the destination address of the package is reached. If not, then the network adapter determines the direction of the destination cell and sets the output switch to the corresponding position. If the package destination address is reached, the CPU's interrupt is triggered to perform the eDNA functionality. After the CPU's register access, the network adapter checks the new destination address of the datagram before sending it. Before transmitting, the network adapter checks whether the next cell on the direct way to the destination cell is alive and not busy. In case it is, it simply tries to send the package to one of the neighbouring cells, this mechanism ensures that dead or busy cells on the way to the destination can be sidestepped, and dead locks can be avoided so that no package will be lost in the system.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A system comprising:
 a reconfigurable hardware platform;
 a plurality of hardware units defined as cells adapted to be programmed to provide self-organization and self-maintenance of the system by means of implementing a program expressed in a programming language defined as DNA language, where each cell is adapted to communicate with one or more other cells in the system;
 where the system further comprises a converter program adapted to convert keywords from the DNA language to a binary DNA code;
 where the self-organization comprises that the DNA code is transmitted to one or more of the cells, and each of the one or more cells is adapted to determine its function in the system;
 where if a fault occurs in a list cell and the first cell ceases to perform its function, self-maintenance is performed by that the system transmits information to the cells that the first cell has ceased to perform its function, and then the self-organization is performed again in order to provide that a second cell undertakes the function of the first cell.

2. A system according to claim 1, wherein the cells are adapted to behave like a language parser, whereby only DNA code is used for performing self-organization and self-maintenance of the system.

3. A system according to claim 1, further comprising at least one data recovery center (DRC), which is a table containing one or more variables in the system, where the DRC is produced by that at least one cell differentiates to become the DRC.

4. A system according to claim 1, wherein the cells request and transmit information from and to other cells in the system.

5. A system according to claim 1, wherein a third cell undertakes the function of the second cell, if the second cell has undertaken the function of the first cell.

6. A system according to claim 5, wherein each cell calculates whether it is positioned before or after the first cell following a growth pattern, and if the cell is positioned after the first cell, the cell is renumbered to have a cell number which is one less than the number it had before.

7. A system according to claim 6, wherein a DNA syntax defined as a parallel syntax is adapted to provide that independent parts of the system are executed in parallel.

8. A system according to claim 7, wherein the parallel syntax is adapted to provide that the cells grow the independent, parallel parts in parallel.

9. A system according to claim 8, wherein cells are adapted to implement a function on a higher level of logical granularity than gate-level.

10. A system according to claim 9, wherein the cells are adapted to interpret the DNA code in a functional way, whereby each function that the DNA code expresses is placed in one cell.

11. A system according to claim 10, wherein one cell defined as a guard cell performs the function of a guardian circuitry.

12. A system according to claim 11, wherein the DNA code is adapted to implement multiple <statements>, which are statements in the DNA language.

13. A method of providing self-organization and self-maintenance of a system comprising a reconfigurable hardware platform and a plurality of hardware units defined as cells, where the method comprises:
programming one or more of the cells to provide self-organization and self-maintenance of the system by means of implementing a program expressed in a programming language defined as DNA language, and where each cell is adapted to communicate with one or more other cells in the system;
converting keywords from the DNA language to a binary DNA code by means of a converter program;
transmitting the DNA code to one or more of the cells, and each of the one or more cells is adapted to determine its function in the system;
transmitting information to the cells, if a fault occurs in a first cell and the first cells ceases to perform its function, whereby self-maintenance is performed by the system; and
performing the self-organization again in order to provide that a second cell undertakes the function of the first cell.

14. A computer program product comprising program code means for causing a data processing system to perform the method of claim 13 when said program code means are executed on the data processing system.

15. A computer program product according to claim 14, comprising a computer-readable medium having stored thereon the program code means.

* * * * *